June 4, 1963     S. F. REED     3,092,402
MEDIA OF EXCHANGE

Filed Nov. 5, 1957     3 Sheets-Sheet 1

INVENTOR
STANLEY F. REED

BY

ATTORNEY

June 4, 1963     S. F. REED     3,092,402
MEDIA OF EXCHANGE
Filed Nov. 5, 1957     3 Sheets-Sheet 2

INVENTOR
STANLEY F. REED

BY *Leo Wilder*

ATTORNEY

June 4, 1963  S. F. REED  3,092,402
MEDIA OF EXCHANGE
Filed Nov. 5, 1957  3 Sheets-Sheet 3

INVENTOR
STANLEY F. REED
BY
ATTORNEY

United States Patent Office 3,092,402
Patented June 4, 1963

3,092,402
MEDIA OF EXCHANGE
Stanley F. Reed, Falls Church, Va., assignor to American Scientific Corporation, a corporation of Virginia
Filed Nov. 5, 1957, Ser. No. 694,619
1 Claim. (Cl. 283—57)

This invention relates to improved media of exchange, and more particularly to a system of currency using light, durable articles as units of value.

Paper currency has the primary purpose of facilitating trade by eliminating the necessity of carrying on trade by barter. It operates as a medium of exchange and provides common units of value in which to measure and state the values of goods and services. The use of paper as the vehicle affords protection against counterfeiting by allowing for the use of (1) elaborate and intricate printing plates, and (2) methods of printing requiring a very large capital investment to effectuate, making "good quality" counterfeiting unprofitable.

But there are several major disadvantages inherent in the use of paper for currency. It wears out easily, necessitating an enormous annual cost of reprinting the currency, and it cannot be easily handled or identified by automatic machines. Silver currency is more durable, but is too heavy for large quantities to be practicable. Moreover, silver does not offer as great protection against counterfeiting as does paper currency, and thus is suitable for identifying only relatively small values.

Accordingly, the provision of a currency which retains the same protection against counterfeiting embodied in the present systems and having the same, or less, weight, but which is more durable and adaptable to machine handling and counting, is a great advance in the art of exchange media.

It is therefore a primary object of the invention to provide a system of currency using light durable articles as units of value.

Another object of the invention is to provide a system of currency which cannot be easily counterfeited.

A further object of the invention is to provide a system of currency which is designed to be easily handled and identified by automatic machines.

These and other objects and advantages of the invention will be brought out more fully in the following description of an illustrative embodiment thereof, when considered in connection with the accompanying drawings, in which:

FIG. 3 illustrates how value may be indicated by the length of slots.

FIG. 4 illustrates how value may be indicated by the depth of slots.

FIG. 5 illustrates how value may be indicated by the number of steps in a slot.

FIG. 6 illustrates how value may be indicated by the number of slots.

FIG. 7 illustrates how value may be indicated from the depth of serrations.

FIG. 8 illustrates how value may be indicated from the number of serrations.

FIG. 9 illustrates how value may be indicated from the number, size, and position of serrations.

FIG. 10 illustrates how value may be indicated from the position of serrations.

FIG. 11 illustrates how value may be indicated from the number of pips.

FIG. 12 illustrates how value may be indicated from the number, size, and position of pips.

FIG. 13 illustrates how value may be indicated from the position of pips.

Figure 1:
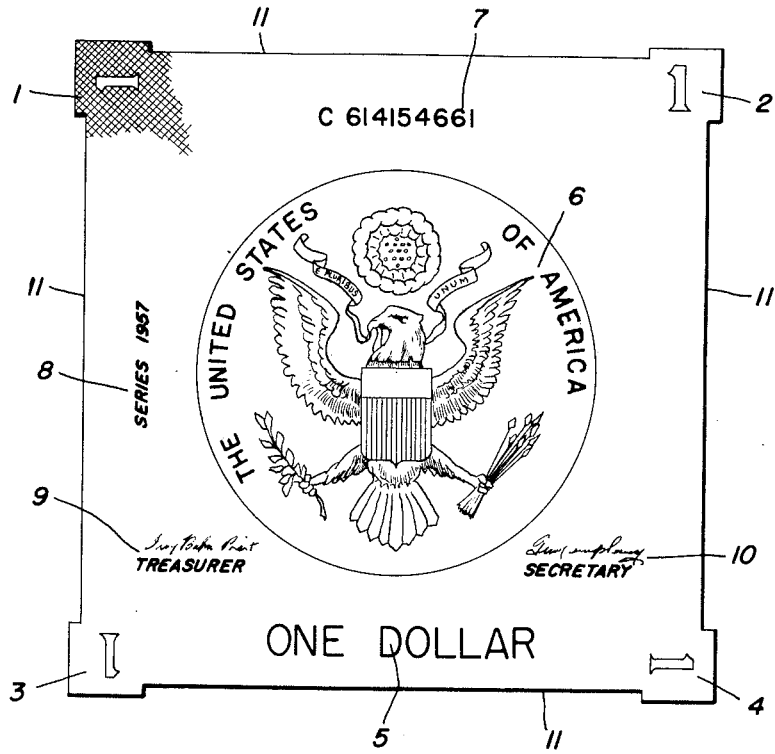
FIG. 1 is an illustration of one form of currency constructed in accordance with the invention.

Referring now to FIG. 1, there is shown an article which may be in the form of a wafer and which is identified with the value of one dollar, the designation of which appears in numerical form in each of the four corners 1, 2, 3, and 4; and in word form at 5. In the center of the article is a picture 6, which may conveniently be one side of the Great Seal, as shown. Other visual indicia on the article may be the serial number 7, a designation of the currency series 8, and authorizing signatures at 9 and 10. All of these visual indicia are physically cast into the article in such a way as to produce a three-dimensional surface, and a method by which this may be accomplished is described below in reference to FIG. 2.

On each of the four edges of the article shown in FIG. 1, appear notches 11 which represent the value identified with the article, a longer length of notch representing a value of smaller denomination. These notches may, of course, be replaced by serrations, pips, slots, or any other means for making the article physically identifiable.

Several alternative means for identifying value are shown in FIGS. 3–16. Each figure shows one edge of a plurality of articles constituting a family of currency with values ranging from $1.00 to $500.00.

Figure 3:
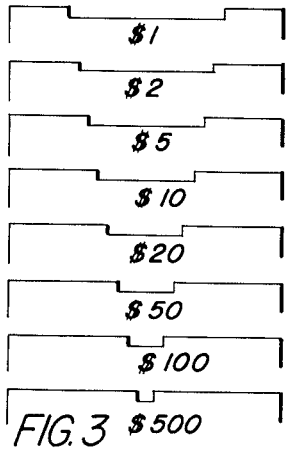
FIGS. 3 to 13 illustrate alternative ways of identifying the value of each piece of currency constructed in accordance with the invention.

In FIG. 3, the value is identified by the length of a slot in the edge, longer slots denominating smaller values. In this way, a would-be counterfeiter may not raise the value merely by cutting a new notch.

Figure 4:
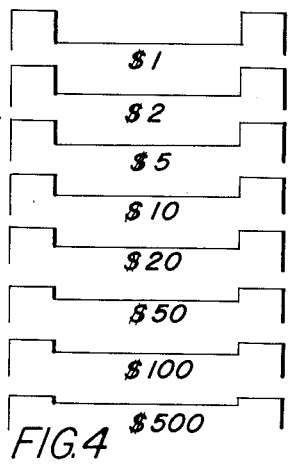

In FIG. 4, the depth of the notch is varied, being deeper for smaller values.

Figure 5:
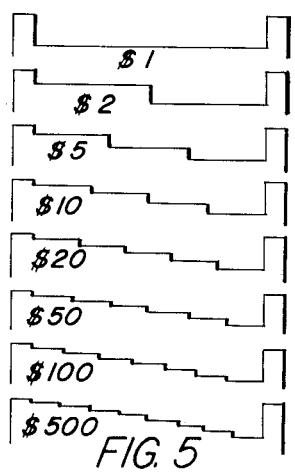

In FIG. 5, the value is determined by the number of steps in each notch, the last step being at a constant depth. In this manner, the lowest value is indicated by the greatest deformation, and cutting new slots could only serve to lessen the value indicated.

Figure 6:
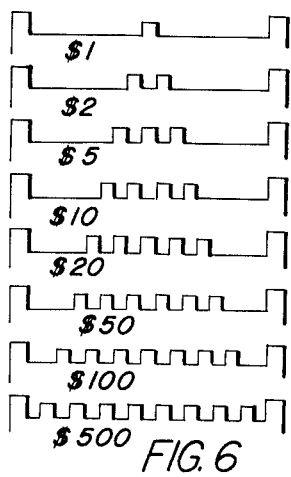

In FIG. 6, the number of slots on the edge indicates the value, again with the greatest number of slots indicating the largest value.

Figure 7:
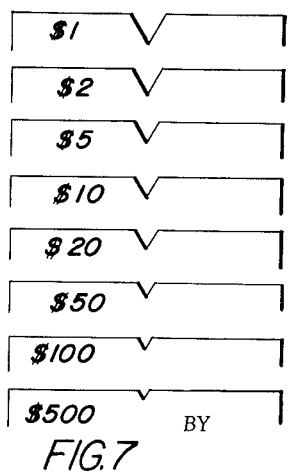

In FIG. 7, the value is indicated by the depth of a serration, much in the same way as in FIG. 4.

Figure 8:
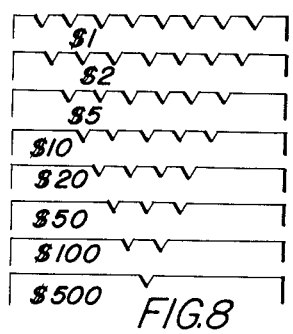

In FIG. 8, the number of serrations on an edge indicates the value, with a smaller value indicated by a greater deformation.

Figure 9:
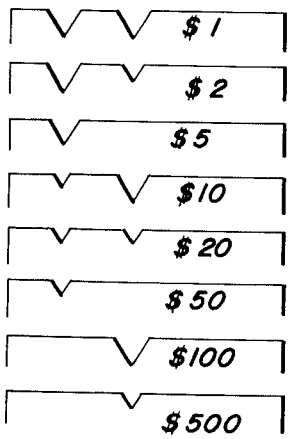

In FIG. 9, the value is indicated by the number, size, and position of serrations on the edge of the articles. The coding serrations indicative of value is so arranged, that no new serrations may be cut, or old serrations enlarged, without reducing the value indicated.

Figure 10:
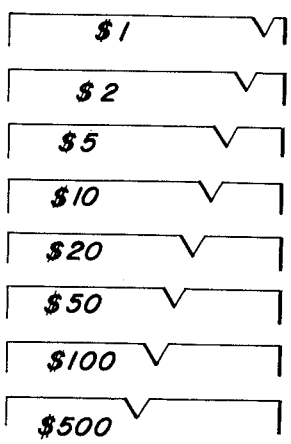

In FIG. 10, the position of serrations on the edge indicates the value. Here, the deformation nearest a corner indicates the value.

Figure 11:
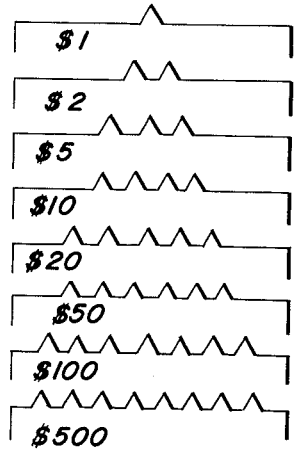

In FIG. 11, value is indicated by the number of pips on the edge of the articles, a larger number of pips indicating a greater value.

Figure 12:
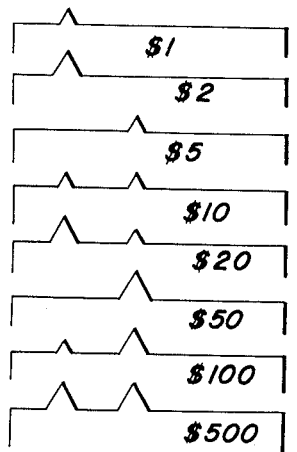

In FIG. 12, the number, size, and position of pips indicates the value, the coding arranged as in FIGURE 9 so that tampering (by cutting off a pip) cannot raise the indicated value.

Figure 13:
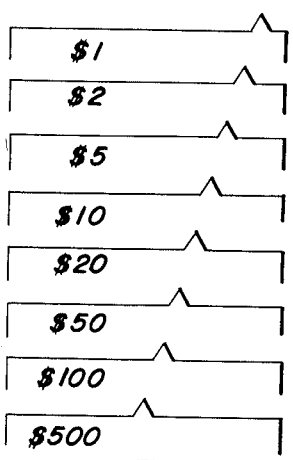

In FIG. 13, the value is indicated by the position of pips on the edges of the articles, the pips closest to a corner indicating value.

The material of which the wafers are composed is substantially more durable than paper, so that they need not be replaced as frequently; and more flexible and self-supporting than paper, so that they may more conveniently be handled by machine. An example of one such material is a synthetic resin.

Figure 2:
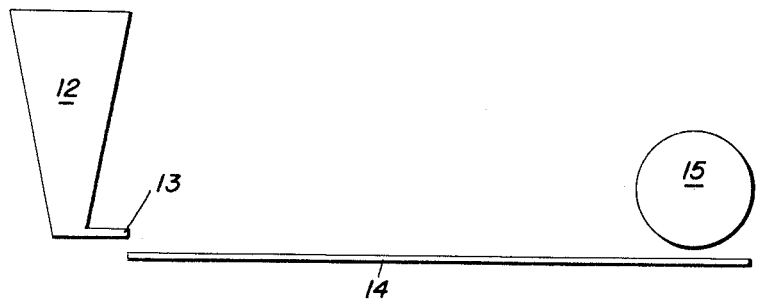
FIG. 2 is an illustration of one method of manufacturing the currency of FIG. 1 in accordance with the invention.

Referring now to FIG. 2, there is shown an illustration for manufacturing the article of FIG. 1. Some type of synthetic resin is melted in hopper 12 and extruded through extrusion nozzle 13 onto an inked intaglio printing plate 14 which bears an intricate physical indicia which may be that shown in FIG. 1 including a very fine filigree (some of which is shown in corner 1) customarily found on paper currency. Chilling roll 15 then rolls over the upper surface of the synthetic resin and solidifies it. The upper surface of the completed article may then be printed in a conventional way with a suitable design.

As an example of an embodiment constructed in accordance with the invention, the synthetic resin of the article itself and the bases of the inks used in printing both sides of the article may be identical or different superpolymers as, for example, a polyamine formed from the interaction of a diamine upon a dicarboxylic acid. A superpolymer (or copolymer when the bases are not identical) may be produced by radioactively irradiating the printed product, bonding the inks to the synthetic resin base of the article. Alternatively, a synthetic silicone resin may be used.

The article may be carefully controlled in its manufacture to permit machine recognition of the value identified with each object by means of any of a number of physical characteristics, or a combination thereof.

The size, shape, volume, or weight may be predetermined by regulating the size and shape of the completed articles, the shape of the identifying notches or serrations, or the density of the composition of the articles. Also the density, for example, may be varied throughout the volume of the articles by controlling the composition of the article or the placement of some artificial weighting substance at pre-determined places within the articles.

Similarly the electrical characteristics such as dielectric constant, resistivity, and inductance of the articles may be regulated and made uniform or non-uniform throughout each article. These properties may be made different for articles identified with different values, to identify each value.

The magnetic characteristics such as permeability may be controlled in a uniform or non-uniform manner throughout each article and may be different for each different value. This also may be accomplished by adjusting the composition or content of the article.

Mechanical characteristics such as flexural strength, modulus of elasticity, or resonant frequency may be made identifying features in a similar way to provide identifying characteristics.

Thermal characteristics such as thermal conductivity, expansion or melting point may be regulated by the composition and content of the article, to provide identifying characteristics.

Optical qualities such as color, transparency, and index of refraction may be made identifying characteristics.

The relative quantity of absorption, or frequency of maximum absorption, of radiation, such as alpha or beta particles, gamma or X-rays, infrared, ultraviolet, or monochromatic light, or radio frequencies, may be made the basis of identification.

The crystalline structure of the article as indicated by an X-ray diffraction pattern may be predetermined by controlling the rate and quantity of polymerization, and the kind of polymer used in manufacture. This also may be used as an identification characteristic.

Similarly the chemical composition may be adjusted to identify the articles and values by, for example, spectrometry.

The emission of alpha, beta, gamma or infrared radiation may be used as an identification characteristic. The first three may be predetermined from the decay characteristics of a radioactive additive. Infrared radiation emission may be predetermined from the specific heat of the material of which the articles are composed.

Photoelectric properties such as electroluminescence and fluorescence may be predetermined by proper treatment of the articles when manufactured, and used as the basis for identification.

Either a single physical characteristic, exemplary ones of which are described above, or any combination of them, may be used as a means of identifying genuine currency as distinguished from counterfeit currency, and as a means for identifying the particular value identified with a specific article of currency. The foregoing list of characteristics is not intended to be exhaustive of such means, and others will doubtless occur to those skilled in the art.

Having thus described an exemplary embodiment of my invention, what I desire to claim is:

As media of exchange, the combination comprising: a series of related, light, durable, thin, self-supporting, plastic wafers, all of said wafers being of substantially the same size and having intricate physical surface characteristics that are visually identifiable, the front and reverse sides of each wafer being similar and each wafer having a generally square surface configuration, each wafer of said series corresponding to a predetermined extrinsic denomination, said intricate surface characteristics correlated to said denomination, each of said denominations being indicated by similar deformations similarly oriented on each of the four edges of said square configuration, the deformations in each wafer of said series correlated to the deformations in every other wafer of said series in accordance with an ordered progression and the size of said deformations being in inverse relationship with respect to the extrinsic denomination associated therewith.

References Cited in the file of this patent

UNITED STATES PATENTS

| | | |
|---|---|---|
| 623,857 | Williams | Apr. 25, 1899 |
| 624,597 | Williams | May 9, 1899 |
| 1,209,998 | Pinckert | Dec. 26, 1916 |
| 1,586,111 | Osborn | May 25, 1926 |
| 1,692,140 | Rawley | Nov. 20, 1928 |
| 2,542,870 | Hyland | Feb. 20, 1951 |